US008446744B2

(12) United States Patent
Scheel et al.

(10) Patent No.: US 8,446,744 B2
(45) Date of Patent: May 21, 2013

(54) METHOD FOR CONTROLLING A SWITCHING DEVICE OF A RESONANT POWER CONVERTER, ESPECIALLY IN ORDER TO PROVIDE A REQUIRED POWER, ESPECIALLY FOR AN X-RAY GENERATOR

(75) Inventors: Thomas Scheel, Stolberg (DE);
Christian Hattrup, Wurselen (DE);
Peter Luerkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 319 days.

(21) Appl. No.: 12/920,328

(22) PCT Filed: Mar. 2, 2009

(86) PCT No.: PCT/IB2009/050824
§ 371 (c)(1),
(2), (4) Date: Aug. 31, 2010

(87) PCT Pub. No.: WO2009/109892
PCT Pub. Date: Sep. 11, 2009

(65) Prior Publication Data
US 2011/0007528 A1    Jan. 13, 2011

(30) Foreign Application Priority Data
Mar. 6, 2008  (EP) .................................... 08102353

(51) Int. Cl.
*H02M 3/335* (2006.01)
*H02M 7/10* (2006.01)

(52) U.S. Cl.
USPC .............. 363/49; 363/16; 363/17; 363/21.02;
363/55; 363/56.02; 363/56.05; 363/98; 363/132;
323/235; 323/237; 323/238; 323/247; 323/901;
323/908

(58) Field of Classification Search
USPC .................. 363/16, 17, 21.02, 49, 55, 56.02,
363/56.05, 98, 132; 323/235, 237, 238, 247,
323/901, 908
See application file for complete search history.

(56) References Cited

U.S. PATENT DOCUMENTS

| 5,267,138 | A | 11/1993 | Shores |
| 5,546,300 | A * | 8/1996 | Lee et al. ...................... 363/132 |
| 5,684,688 | A | 11/1997 | Rouaud et al. |
| 5,717,582 | A | 2/1998 | Duong |
| 6,351,401 | B1 | 2/2002 | Scheel et al. |
| 6,356,462 | B1 * | 3/2002 | Jang et al. ...................... 363/17 |
| 6,392,902 | B1 * | 5/2002 | Jang et al. ...................... 363/17 |
| 6,992,902 | B2 * | 1/2006 | Jang et al. ...................... 363/17 |
| 7,167,381 | B2 | 1/2007 | Scheel et al. |
| 2005/0041439 | A1 * | 2/2005 | Jang et al. ...................... 363/17 |
| 2005/0275310 | A1 * | 12/2005 | Ripoll ............................ 310/317 |
| 2006/0181906 | A1 | 8/2006 | Batarseh et al. |
| 2008/0247194 | A1 * | 10/2008 | Ying et al. ...................... 363/17 |

FOREIGN PATENT DOCUMENTS

| EP | 1956703 A1 | 8/2008 |
| WO | 2006114719 A1 | 11/2006 |

* cited by examiner

*Primary Examiner* — Bao Q Vu

(57) ABSTRACT

A method and a control device control a switching device for providing a resonant circuit with a switching voltage for generating a resonant current in order to provide a required output power at an output of a resonant power converter.

15 Claims, 10 Drawing Sheets

US 8,446,744 B2

METHOD FOR CONTROLLING A SWITCHING DEVICE OF A RESONANT POWER CONVERTER, ESPECIALLY IN ORDER TO PROVIDE A REQUIRED POWER, ESPECIALLY FOR AN X-RAY GENERATOR

FIELD OF THE INVENTION

This present invention relates to a method for controlling a switching device in order to provide a resonant circuit with a switching voltage for generating a resonant current in order to provide a required output power at an output of a resonant power converter. The invention further relates to a control device which is adapted to perform the proposed method for controlling a switching device. Moreover the invention relates to a resonant power converter including a control device for performing the proposed controlling method.

BACKGROUND OF THE INVENTION

State of the art resonant converters operate at switching frequencies just above the audible range, thus at 18 kHz or slightly higher. Modern resonant converters are operating at higher switching frequencies resulting in proportionally increased switching losses, if no means is applied to reduce them. Any switching losses incurred by associated power switches in a single switching cycle have to be reduced in order to limit the overall power losses. One method to reduce such switching losses is Zero Current Switching (ZCS), which is a soft switching method. Here switching, which means turning switches on or off, is only performed when at or near a zero crossing of a resonant current of the resonant converter occurs.

The ZCS method is common practice in soft switching converters, but is disadvantageous, since it inhibits the controllability of the output power of the resonant converter. A continuous control for all points of operation in a non-ZCS method in the common way does guarantee results in switching losses. In order to overcome this disadvantages a further switching method based on the ZCS method was provided by WO 2006/114719A1. There the conflicting requirements of good controllability on the one hand and reduction of switching losses by applying ZCS on the other hand is overcome. The suggested resonant DC/DC power converter in WO 2006/114719A1 has less power losses although a soft switching control mode is used. This is achieved by switching the power switches only at or near, which includes shortly before or shortly after, the zero crossing of the resonant current. Under this condition the switching time instances and the frequency of the applied converter voltage are self-adjusting and cannot be used to adjust the output power. The power is controlled instead by selecting a switch configuration, defined by which of the power switches of the converter are turned on or off, resulting in a converter that has an output power controllable over a wide range able to efficiently limit switching losses by ensuring ZCS for every switching cycle.

As a result, in WO 2006/114719A1 a control method has been described that allows zero current switching for all operating points while maintaining full controllability of the output voltage. Due to the zero current switching the power losses are very low. The method is based on the transfer of discrete power portions from the mains supply to the output of a power converter. The discrete power portions are generated by applying a voltage to the resonant circuit that is in-phase to the current ("+state"), a zero voltage ("0state") or an anti-phase voltage ("−state"). The discretization of the applied power portions is given by the number of available control levels. For the three-level control method thus three different power levels plus (+), zero (0), minus (−) are valid (see also FIGS. 2 to 4, which will be described in more detail below).

Generally the required power for a specific operation point lies in between two power levels (e.g. between the plus power level and the zero power level). The outcome of the described control strategy is that for a certain amount of time the upper power level is activated and for another amount of time the lower power level is used. Nevertheless the average power in time should be identical to the required power. The result of applying the two different power levels is a variation of the output voltage from the required voltage with a certain frequency and amplitude depending on the operation point. This phenomenon is called chattering.

For operating points that are near the plus-level (see also FIG. 6, which will be described in detail below) there is not much surplus power available to increase the output after a dropdown of the voltage. At the same time the output voltage decreases rapidly if a zero-level is applied. As a consequence the chattering frequency of the output voltage becomes very low and the amplitude very large.

A self-evident recipe to avoid this large chattering is to forbid operating points near the plus-level power. This would require an over dimensioning of the high voltage generator leading to higher costs. Furthermore, it is not excluded by itself, that there are other intermediate operating points, which have a similar property. It is therefore an object of the invention to reduce the chattering effects during the operation of a resonant power converter. Thus, this invention proposes an improvement to reduce the voltage chattering without over dimensioning of the generator. This provides also an improvement of a common three-level control strategy.

SUMMARY OF THE INVENTION

It is an object of the invention to provide a method and a device which reduce the chattering phenomenon at the output of a resonant power converter.

The object of the invention is solved by the subject matter of the independent claims, advantageous embodiments are incorporated in the independent claims.

It should be noted that in the following described exemplary embodiments of the invention apply also for the method and the device.

According to an exemplary embodiment there is provided a method for controlling a switching device in order to provide a resonant circuit with a switching voltage for generating a resonant current in order to provide a required output power at an output of a resonant power converter, wherein the method comprises providing the required output power at the output of the resonant power converter by using a first control mode and a second control mode in an alternating sequence, wherein the first control mode (−/0/+) is a soft/smooth switching control mode with respect to the switching voltage and to the resonant current and wherein the second control mode is a non-soft switching control mode with respect to the switching voltage and to the resonant current. One control mode may comprise different operation modes, such as +state, −state and 0state for the first control mode.

The suggested method combines a first control mode and a second control mode within one single controlling method, whereas the sequence of both control modes is arbitrarily used. This means that either the first control method or the second control method is used firstly and then the other control mode either the second control mode or the first control mode is used in subsequent. Thereby it is also not necessary that both control modes are subsequent in time directly after each other. Furthermore the time span for applying the first control mode is not necessarily equal to the time span the second control mode is used.

In summary an alternating sequence means that the first control mode and the second control mode is used within one operation procedure of the resonant power converter, whereas either the first control mode or the second control mode is used firstly at a certain time. Afterwards the other control mode, either the second control mode or the first control mode, depending which was chosen first, is used afterwards, wherein the first control mode and the second control mode or the second control mode and the first control, respectively are not necessarily used directly after each other. The combination of a soft switching of the first control mode at one time and a non-soft switching of the second control mode at an other time influences the voltage chattering at the output of the resonant converter.

The voltage chattering for operating points near the maximum output power will be reduced drastically. This can be achieved without over dimensioning of the generator and will thus reduce costs. It is essential for a cost effective generator system.

The term "soft switching" is used here in the sense of intentionally choosing a switching moment of the switches of the switching device at a time when a zero crossing of the resonant current takes place. A soft switching condition is also meet if the zero crossing of the resonant current is only substantially a zero crossing, which means that it is close to a zero crossing of the resonant current. This means slight deviation with reference to zero are allowable for soft switching. In all situations of soft switching it is required that the moment of switching is chosen intentionally and does not take place accidentally. A random switching would not be a controlling of the switches itself.

The term "non-soft switching" is used here in the sense of intentionally not choosing a switching moment of the switches of the switching device where a zero crossing of the resonant current takes place.

Under the soft-switching condition the switching losses are small, ideally zero, whereas under the non-soft switching condition the switching losses are not suppressed. This means the suggested controlling method is based on an acceptance of switching losses within the second control mode, whereas the switching losses within the first control mode are favored to have minimum value. Therefore the soft-switching control mode and the non-soft switching control mode differ from each other in their switching losses to be accepted.

According to an exemplary embodiment of the invention in the first control mode the switching voltage is zero.

It is possible that the first control mode comprises more than one operation mode. One possible operation mode whereas soft switching is possible takes place in a situation when the switching voltage is of zero value. This means the voltage is not zero for only a zero crossing, but it is also zero while the resonant current has a certain waveform. This zero value of the switching voltage may be obtained by avoiding a switching voltage within the resonant converter. This may be possible when no voltage is supplied to the resonant converter or when the switches of the switching device are chosen to generate a zero switching voltage. Thereby the waveform (e.g. amplitude and frequency) of the resonant current depends on the amount of energy stored in the resonant elements of the resonant circuit (e.g. inductance and capacitance) and depends on the voltage on the primary side of the transformer, which is connected to the resonant circuit.

According to an exemplary embodiment of the invention in the first control mode the switching voltage and the resonant current are in a first predetermined phase relation to each other.

When determining the phase relation between the switching voltage and the resonant current, it is possible that either the switching voltage or the resonant current is the reference. The switching voltage which may be generated by using a DC voltage at a first terminal of the input of a resonant converter, e.g. a series resonant converter. The switching voltage is the output voltage of a DC/AC converter, whereas the switching voltage has an AC characteristic, which means that it has at least two different voltage levels and usually also different polarities, if no offset in relation to the switching voltage is present. The current which is present within the resonant circuit is the resonant current. The switching voltage, which is also present within the resonant circuit, and the resonant current are in a certain relation to each other when comparing their time dependent waveform. This relation is a first relationship between the switching voltage and the resonant current and may be chosen intentionally.

According to an exemplary embodiment of the invention in the second control mode the switching voltage and the resonant current are in a second predetermined phase relation to each other.

This second relationship between the switching voltage and the resonant current within the second control mode is also an intentionally chosen phase relation, like the first relationship within the first control mode. Both the first predetermined phase relation and the second predetermined phase relation are selectable values in contrast to random values. When determining the phase relation between the switching voltage and the resonant current, it is possible that either the switching voltage or the resonant current is the reference.

According to an exemplary embodiment of the invention the first predetermined phase relation between the switching voltage and the resonant current is substantially zero.

Under this condition a soft switching is guaranteed. Also a substantially zero value, which is not an exact zero value, but close to zero ensures a soft switching, like it is used for ZCS. Thereby the switching voltage and the resonant current are in phase to each other.

According to an exemplary embodiment of the invention the first predetermined phase relation is substantially 180 degrees.

Under this condition the switching voltage and the resonant current are in anti-phase to each other. It is hereby assumed, as assumed above, that the whole period duration of the switching voltage and the switching current is 360 degrees. Also under this suggested condition of substantially 180 degrees a soft switching is possible, whereas substantially means that the ZCS method is not violated. This is a further possible operation mode within the first control mode.

According to an exemplary embodiment of the invention the second predetermined phase relation is greater than the first predetermined phase relation.

This means that the second predetermined phase is chosen in order to ensure a non-soft-switching condition and the first predetermined phase relation is chosen in order to ensure a soft-switching condition. The first predetermined phase relation may be about 10 degrees while the second predetermined phase relation may be about 30 degrees, as an example.

According to an exemplary embodiment of the invention the second predetermined phase relation is smaller than 90 degrees.

This means when the whole period time of the switching current and the resonant voltage is 360 degrees, respectively, the difference in time between the switching voltage and the switching current is less than a quarter of the whole time period.

According to an exemplary embodiment of the invention the resonant current is in delay in relation to the switching voltage in the second predetermined phase relation.

A delay of the switching voltage is determined when comparing the moment when the switching voltage crosses the zero line with the moment when the resonant current crosses the zero line. If the switching voltage crosses first the zero line and afterwards the resonant current, then the resonant current has a delay.

According to an exemplary embodiment of the invention the switching device is controlled that the first control mode provides a first power level and that the second control mode provides a second power level.

The first power level and the second power level are different from each other, but may however be of the same polarity. The polarity of the output power is defined by the direction of the power within the resonant converter. The output power is deemed to be positive, when the average energy and therefore also the power of the system is transported from the input terminal of the resonant converter towards the output terminal of the DC/AC converter in order to supply a device with the power of the system, for example an x-ray tube. The output power is deemed to be negative, when the average energy and therefore also the power of the system is transported from the output terminal of the DC/AC converter towards the input terminal of the DC/AC converter. In this case the x-ray tube may not consume power. The output power is defined as zero, when either the switching voltage or the resonant current, which both determine the output power of the resonant converter, is zero or substantially zero, respectively.

According to an exemplary embodiment of the invention the first power level and the second power level are both positive.

The first power level may be provided by using the first predetermined phase relation between the switching voltage and the resonant current. The second power level may be provided by using the second predetermined phase relation between the switching voltage and the resonant current. Two positive power levels ensure a more efficient operation of the resonant converter, since there is no reverse of the direction of power transportation within the resonant converter. All power available is directed towards the output of the resonant converter at any time of operation. When the second power level is also a positive level, like the first power level, this would have the advantage, that the energy and power within the resonant circuit would be on a relative stable level not dropping at zero power level.

According to an exemplary embodiment of the invention the first power level is higher than the second power level.

The first power level may provide the maximum possible output power, whereas the second power level may provide a different power level, which is close to the maximum power level, but chosen in order to obtain a predetermined average power level, which may be required by the consuming device at the output terminal of the resonant converter. As a result the average output power, which is ideally the required output power, is in between the first and the second power level. In such a situation the operation of the whole series resonant converter is very effective, since power and energy stays at a higher level in a certain time period and does not reach a zero-power level. This means that the resonant converter may be used to be adapted very quickly for certain power requirements depending on the demand of the consumer. This ensures a high flexibility for the use of the power converter while the switching losses when using the first and second control mode in a sequence (see FIG. 7, which will be described below) are in average small. A further advantage is a low amplitude of chattering.

According to an exemplary embodiment of the invention the switching device is controlled that the first control mode provides a third power level.

This third power level may be zero. With such a third power level it is possible to use the self-adjusting characteristic of the resonant converter, which may depend on the condition of operation used before entering in the third power level. The self-adjusting characteristic may also depend on the electrical components within the resonant converter, especially the electrical components of the resonant circuit, which may be a series resonant circuit of the series resonant converter.

According to an exemplary embodiment of the invention the switching device is controlled that the first control mode provides a fourth power level.

This fourth power level may be negative. With this fourth power level it may be also possible that power is transported from the resonant circuit towards the input of the resonant converter, meaning in the opposite direction compared when using a positive power level. When using the suggested power levels, namely the first, the second, the third and the fourth, then a four-power-level control method may be provided, which ensures an improvement of the chattering characteristic of the resonant converter.

The invention relates further to a control device which comprises an input for receiving data representative of a required output power, a controller, a predictor, a decision block, wherein the decision block is adapted to generate a value to decide a control mode in dependence of the required output power. Within such a control device the controller is adapted to calculate a required change of the output power and generates a value for the decision block, wherein the predictor comprises a first output for a first control mode, which is a soft switching control mode, wherein the predictor comprises a second output for a second control mode, which is a non-soft switching control mode and wherein the control device is adapted to combine both control modes in arbitrary sequence.

A control device of such configuration ensures a compact construction, since for different control modes may be combined within one device.

According to an exemplary embodiment of the invention the predictor further comprises at least one of a third output for the first control mode and a fourth output for the first control mode. At least one further output for the first control mode is suitable to provide different operation modes within the first control mode.

According to an exemplary embodiment of the invention the decision block comprises a second input, which is connected with the second output of the predictor, and further comprises at least one of a first input, which is connected with the first output of the predictor, a third input, which is connected with the third output of the predictor and a fourth input, which is connected with the fourth output of the predictor.

This means that the predictor comprises at least three outputs which may be used for different purposes.

According to an exemplary embodiment of the invention a resonant power converter with a control device comprises a suggested control device.

This control device may be used for resonant converters in general, and especially for a series resonant converter supplying an x-ray tube.

It may be seen as a gist of the present invention to provide both a soft switching control mode and a non-soft switching control mode, which are used subsequent in time resulting in a reduction of a voltage chattering at the output of the power resonant converter while ensuring a required power for a connected device, like an x-ray tube which requires a certain amount of power and also a high voltage for operation. Thereby the order of using the first control method and the second control method is arbitrary.

It should be noted that the above features may also be combined. The combination of the above features may also lead to synergetic effects, even if not explicitly described in detail.

These and other aspects of the present invention will become apparent from and elucidated with reference to the embodiments described hereafter.

BRIEF DESCRIPTION OF THE DRAWINGS

In the following figures some exemplary embodiments are illustrated, wherein.

DETAILED DESCRIPTION OF EXEMPLARY EMBODIMENTS

High voltage generators for x-ray applications may be realized as series resonant converters. In WO 2006/114719A1 a control method for series resonant converters has been described that allows zero current switching for all operating points. Thus, it leads to very low switching losses and enables high frequency operation. A disadvantage of the proposed control method is that for certain operating points the limit cycle frequency of this control methods becomes rather low and the amplitude of unwanted voltage variations (chattering) becomes very high. This invention proposes a cost-effective method to reduce the voltage chattering for those operation points and guarantees low chattering over the complete operation range.

Figure 1:
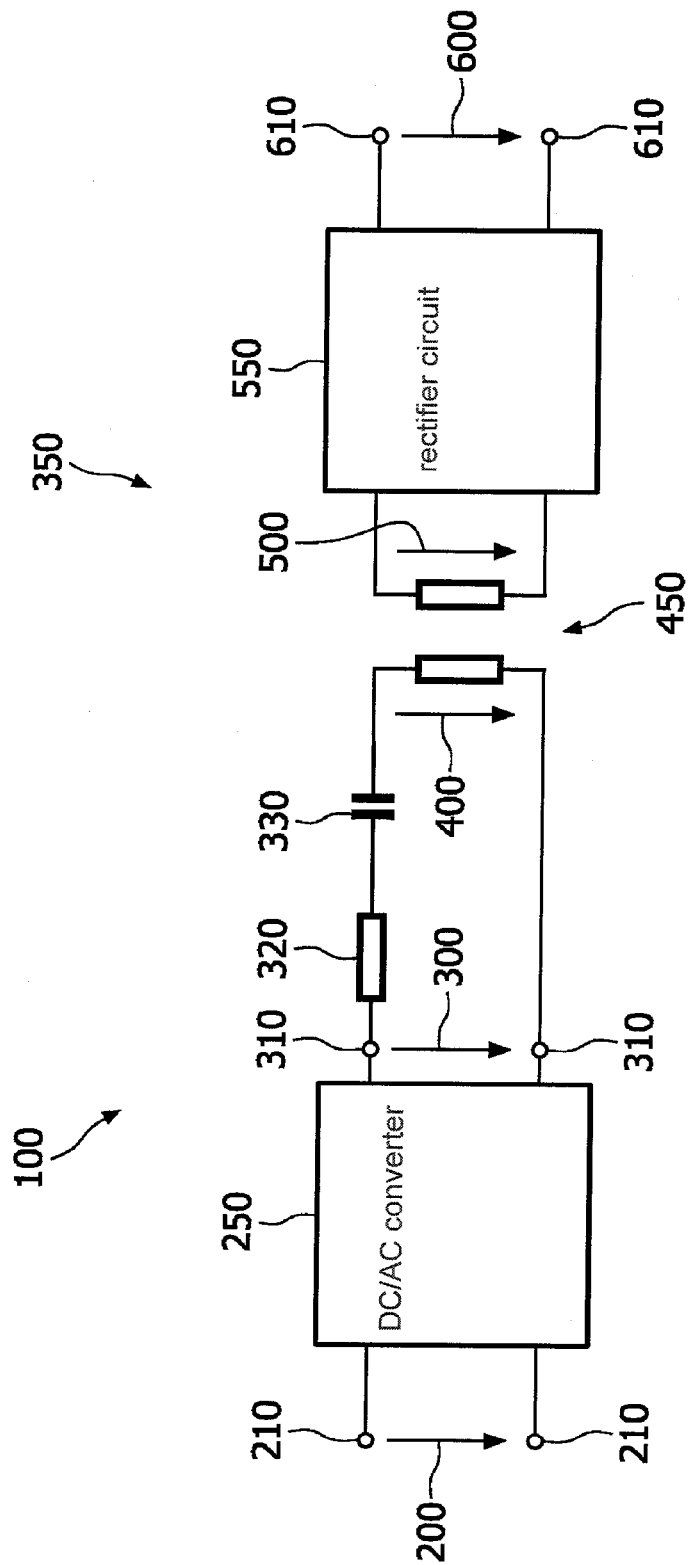
FIG. 1 shows a functional diagram of a high voltage generator.

FIG. 1 shows a functional diagram of a of high voltage generator with a series resonant converter 100. A DC input voltage 200 is converted into an AC voltage 300 and fed into a series resonant circuit 350. A high voltage transformer 450, which is part of the series resonant circuit 350, transforms a low voltage 400 (e.g. 400 V) into a high voltage 500 (e.g. 40 kV). Finally a rectifier circuit 550 increases the voltage level also and generates a high DC voltage 600. Overall within the resonant converter 100 the DC input voltage 200 is converted into a high DC voltage 600 with the help of an DC/AC converter 250 within the resonant converter 100.

The series resonant circuit 350 comprises in addition to the high voltage transformer 450 an inductance 320 and a capacitor 330. The inductance may partly or totally build of the leakage inductance of the transformer. The rectifier circuit 550 may be formed by a rectifier cascade comprising several rectifiers. Alternatively the rectifier circuit 550 may be a voltage doubler topology (which is not a cascade) or a standard bridge rectifier. It is understood that the DC input voltage 200 may be generated by an AC/DC device which is connected to the input of the DC/AC converter 250 of the series resonant converter 100. It is further possible to connect at the output of the rectifier circuit 550 directly a power consuming device, such as an x-ray tube of a medical device. In this case the series resonant converter serves as an x-ray high voltage generator.

Figure 2:
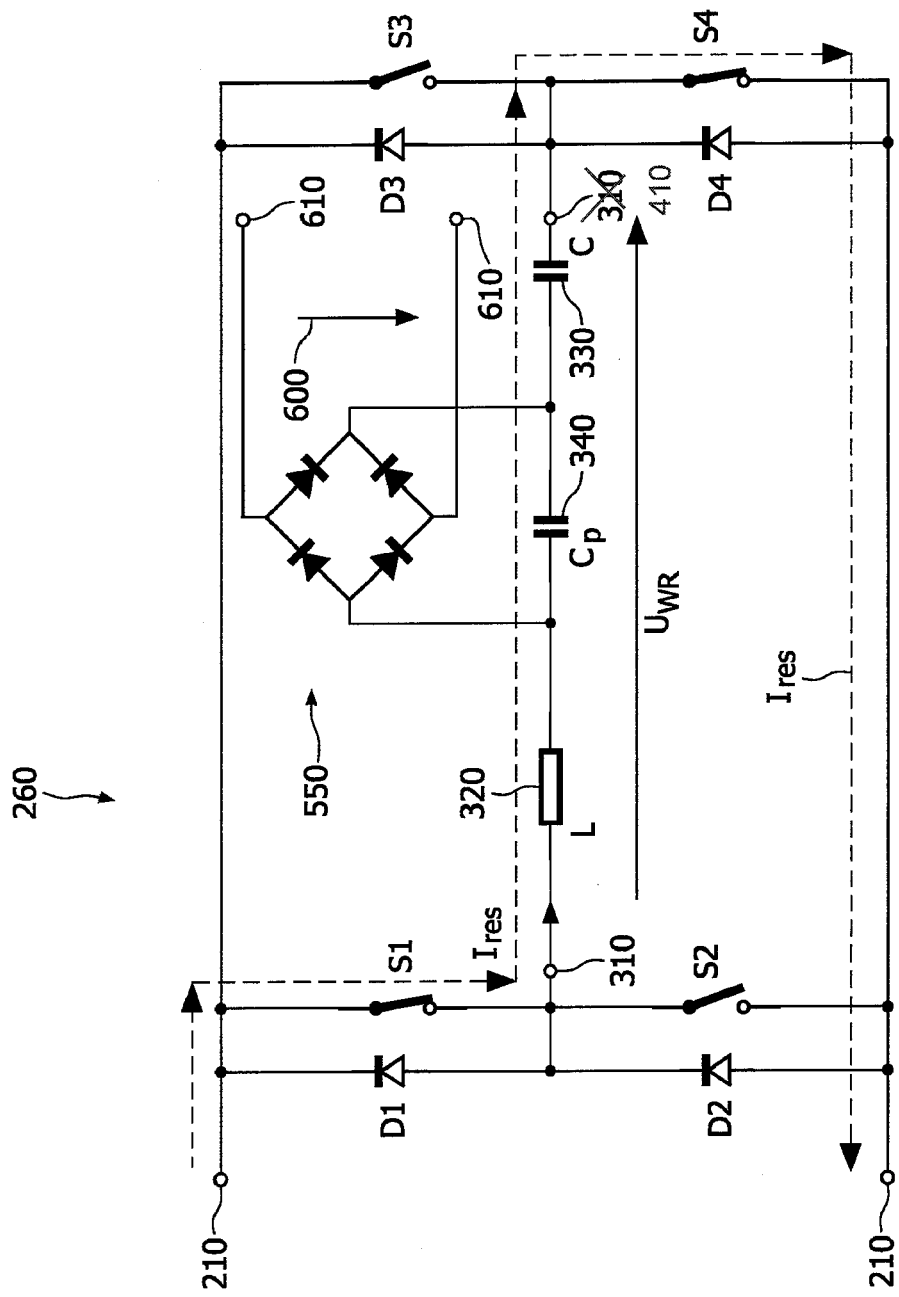
FIG. 2 shows a switch configuration of a DC/AC converter for a plus-state (+state)

The DC/AC converter 250 may be provided as a full bridge converter, as depicted in FIG. 2. The bridge is shown as a one-phase bridge which comprises a first terminal 210 for the DC input voltage 200, as also shown in FIG. 1, and a second terminal 310 for the converted voltage which is the AC voltage 300, as also shown in FIG. 1. The DC/AC converter 250 comprises four switches (S1, S2, S3, S4) which may be controllable semi-conducting elements, which are suitable for switching in a high frequency value or range as desired. Parallel to each switching element an anti-parallel diode (D1, D2, D3, D4) is used, in order to ensure an electrical path in the case the parallel corresponding switching element (D1 and S1; D2 and S2; D3 and S3; D4 and S4) is in an open position. Here diodes are used, but also other semi-conducting elements may be suitable. In summary the switching device 260, here a full bridge comprises four bridge sections, whereas the output of the bridge at the second terminal 310 is connected with a series circuit of the inductance 320 and the capacitor 330. In addition to these components, in FIG. 2 also a parasitic capacitor 340 is shown, which represents the capacitive coupling of the transformer 450. In FIG. 2 the rectifier 550 which is in series with the series resonant circuit 330 is also shown. This rectifier 550 comprises four semi-conducting elements, here four diodes, which transform the output AC voltage 300 (300 is identical with Uwr) of the DC/AC converter 250 into a DC voltage 600, which is higher than the DC input voltage 200 determined by a transformer ratio of the high voltage transformer 450 and further elements of the series resonant converter 100.

Figure 3:
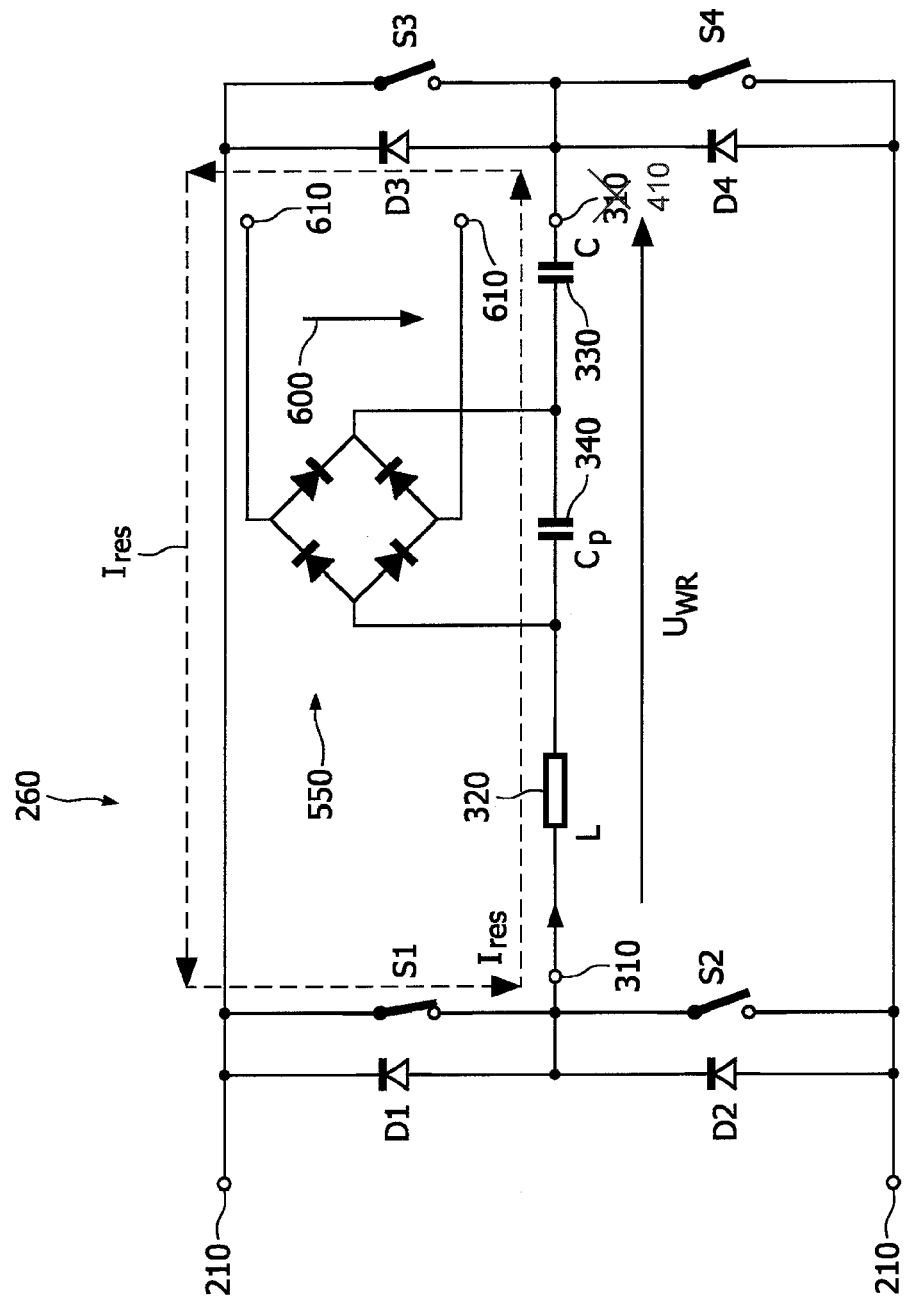
FIG. 3 shows a switch configuration of a DC/AC converter a for zero-state (0state)
Figure 4:
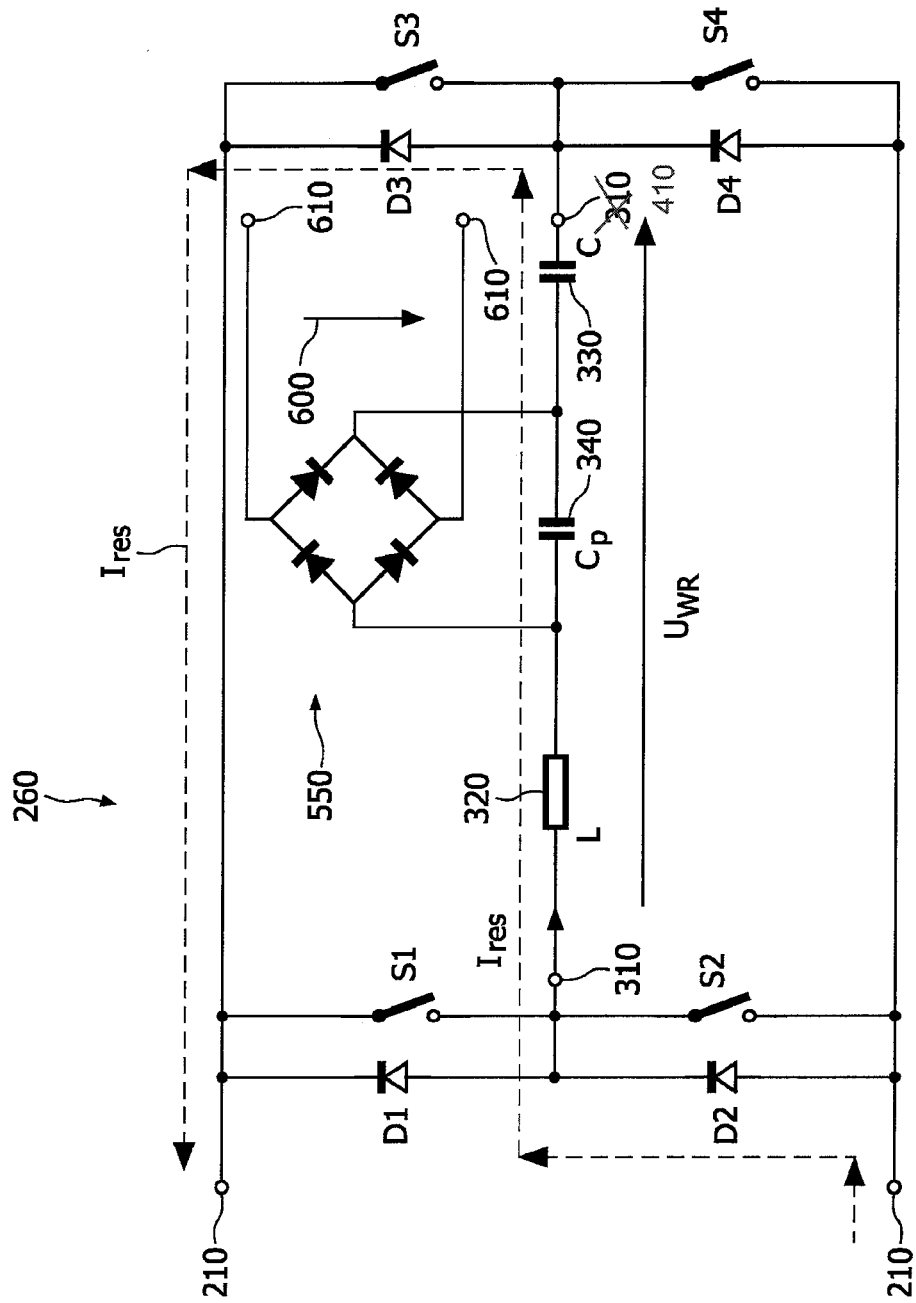
FIG. 4 shows a switch configuration of a DC/AC converter for a minus-state (−state)

FIGS. 3 and 4 show the same elements of the DC/AC converter 250, the series resonant circuit 350 and the rectifier 550, as given in FIG. 2, respectively. The differences between the FIGS. 2, 3 and 4 are given by switching positions of the switching elements S1, S2, S3, S4. Based on these differences a resonant current Ires and a switching voltage Uwr within the series resonant circuit 350 is influenced.

FIGS. 2 to 4 show three different operation modes of the series resonant converter 100. A common feature of these operation modes is the soft switching condition as a first control mode. This means that all switching element S1, S2, S3, S4 are switched at a certain time from the position on to off or from off to on without violating the ZCS method known from the state of the art.

FIG. 2 shows a situation where the resonant current Ires is in phase with the switching voltage Uwr. FIG. 3 shows a situation where the switching voltage Uwr is zero and the resonant current Ires is unequal zero until transient compensations between the elements of the series resonant circuit 350 disappear. In this situation the output power of the DC/AC converter 250 is zero, due to the fact that the power is calculated by the product of the resonant current Ires and the switching voltage Uwr. In FIG. 4 a situation is given, where all switching devices are opened, while the switching voltage Uwr is unequal zero and also the resonant current Ires is unequal zero. Here the switching voltage Uwr and the resonant current Ires are out of phase to each other. Especially they are in an anti-phase relation, which means that the resonant current Ires and the switching voltage have a phase relation to each other of 180 degrees, in the case one period is 360 degree, or in other words they have a phase delay of a half period to each other, when assuming both have the same period in time.

In the following the situation in FIG. 2 is called the "plus state" (+), the situation in FIG. 3 is called the "zero state" (0) and the situation in FIG. 4 is called the "minus state" (−), whereas the Figures show only examples for switch positions enabling these states. The given definition here is based on the given direction of the DC input voltage 200 shown in and the given direction of the high DC output voltage 600 in FIG. 1, respectively. When using the plus-state-situation, then energy and power is transported from the first terminal 210 of the DC/AC converter 250 towards a third terminal 410 of the DC/AC converter 250. On the other hand, when the minus-state-situation occurs, then power is transported out of the resonant circuit 350 towards the input 210 of the DC/AC converter 250. Thus, the resonant current decreases. However, a small amount of energy may still be transferred to the output of 610. In the zero-state-situation of FIG. 3, the series resonant circuit is left by its own and behaves in dependence on the energy in the system when reaching the zero-state-situation and in dependence on the electrical components like the inductance 320, the capacitor 330 and the high voltage transformer 450. Then there is no energy flow at the input 210 of the DC/AC converter 250.

In the FIGS. 2 to 4 the switching voltage Uwr is shown by an arrow in the cross section of the full bridge between the bridge sections. The resonant current Ires, which flows as bridge cross current through the elements of the series resonant circuit 350 is shown as a dotted line in the respective bridge sections and the bridge cross section.

Figure 5A:
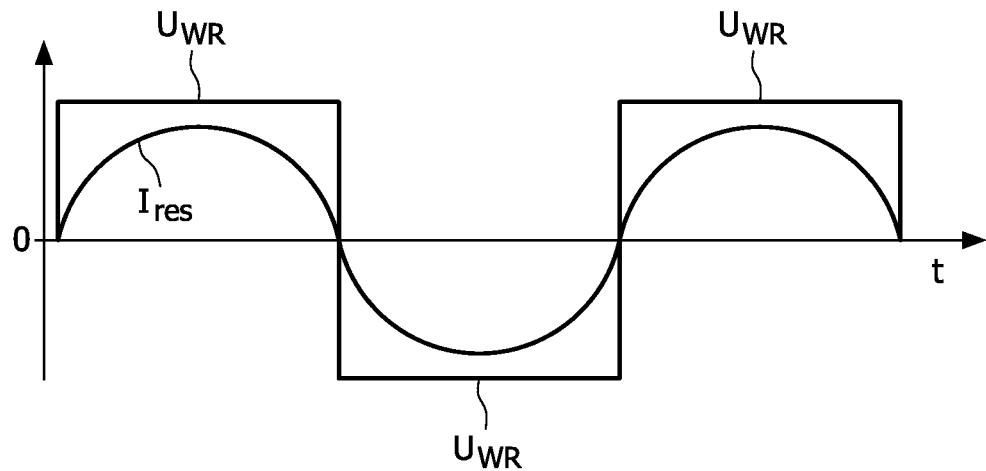
FIGS. 5a and 5b show a converter voltage and current for +state and +d state.
Figure 5B:
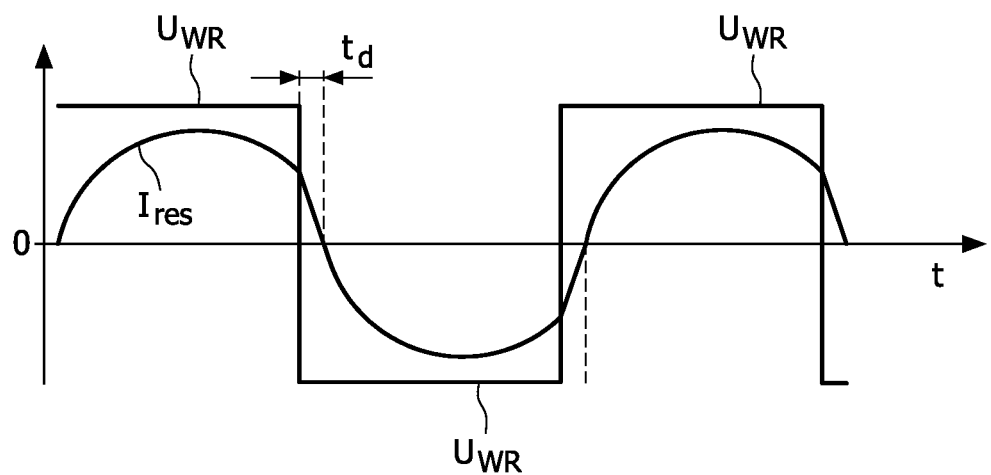

The invention is based on controlling the switching elements S1, S2, S3, S4 in such a way that a first phase relation between the resonant current Ires and the switching voltage Uwr is chosen for a first control mode and a second phase relation between the resonant current Ires and the switching voltage Uwr is chosen for a second control mode. The first and the second operation mode differ from each other in respect to both phase relations. The phase relations are predetermined and not a random value. FIGS. 5a and 5b illustrate such two different phase relations of two different control modes, whereas the x-axis is shown as a time-axis and the y-axis is shown for the value of the resonant current Ires and switching voltage Uwr, which are both time-dependent. The first control mode may be realized by choosing a predetermined value of the first phase relation shown in FIG. 5a, where the resonant current Ires and the switching voltage Uwr are in phase to each other, which means, they have exactly zero degree phase difference or around zero degree phase difference. This substantially zero value may be chosen as a predetermined value. An other first operation mode may be realized by using a first phase relation between the resonant current Ires and the switching voltage Uwr when the resonant current Ires and the switching voltage Uwr are in an anti-phase relation to each other, which means that in FIG. 5a either the resonant current Ires or the switching voltage Uwr is symmetrically inverted in respect to the given time axis.

Then the common zero crossing at predetermined time steps is unchanged, but the direction crossing the time axis is opposite for the resonant current Ires and the switching voltage Uwr. It should be noted, that the term "control mode" is not equally used compared to the term "operation mode". One control mode may comprise different operation modes, such as +state, −state and 0state for the first control mode.

In a second control mode the resonant current Ires and the switching voltage Uwr are in a second predetermined phase relation to each other, which differs form the first predetermined phase relation. This can be seen in FIG. 5b, where a second control mode is shown. Here the switching voltage Uwr crosses the zero-line of the time axis a little bit earlier than the resonant current Ires. This time gap is predetermined in order to guarantee the second control mode. Here the resonant current Ires is in delay in relation to the switching voltage Uwr. As also can be seen from FIG. 5b, the sinusoidal form of the resonant current Ires is not any longer available due to the earlier switching of the switching elements, here S1 and S4. When comparing FIG. 5a and FIG. 5b, then in both control modes the switching elements S1 and S4 are on while the switching elements S2 and S3 are off. This situation is given until the switching elements S1 and S4 are switched off, which can be seen by the shape of the time-curve of the switching voltage Uwr when changing from a positive voltage value to a negative voltage value directly without resting at a zero value. The moment of the zero crossing of the switching voltage is in FIG. 5b earlier, namely of time td, compared to the first control mode. The resonant current Ires which follows the switching voltage Uwr with a time delay of td crosses the time axis later in the second control mode.

Figure 7:
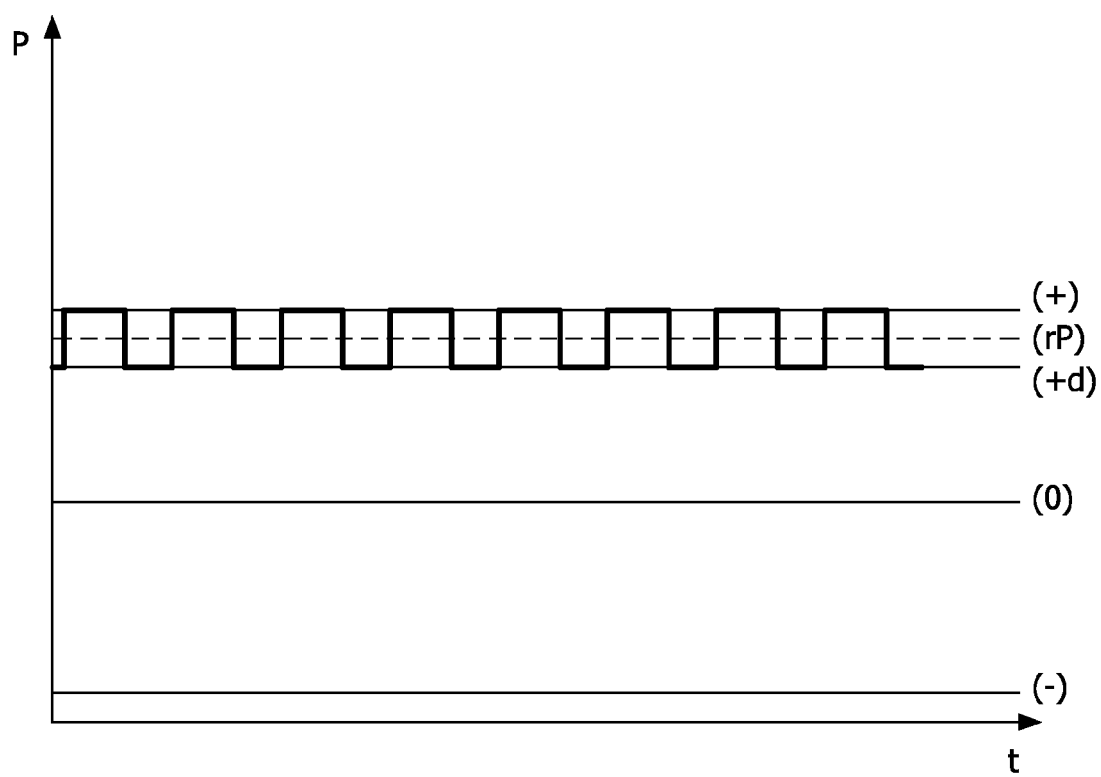
FIG. 7 shows an application of power levels for operating points near maximum output power with an additional power level (+d)
Figure 8:
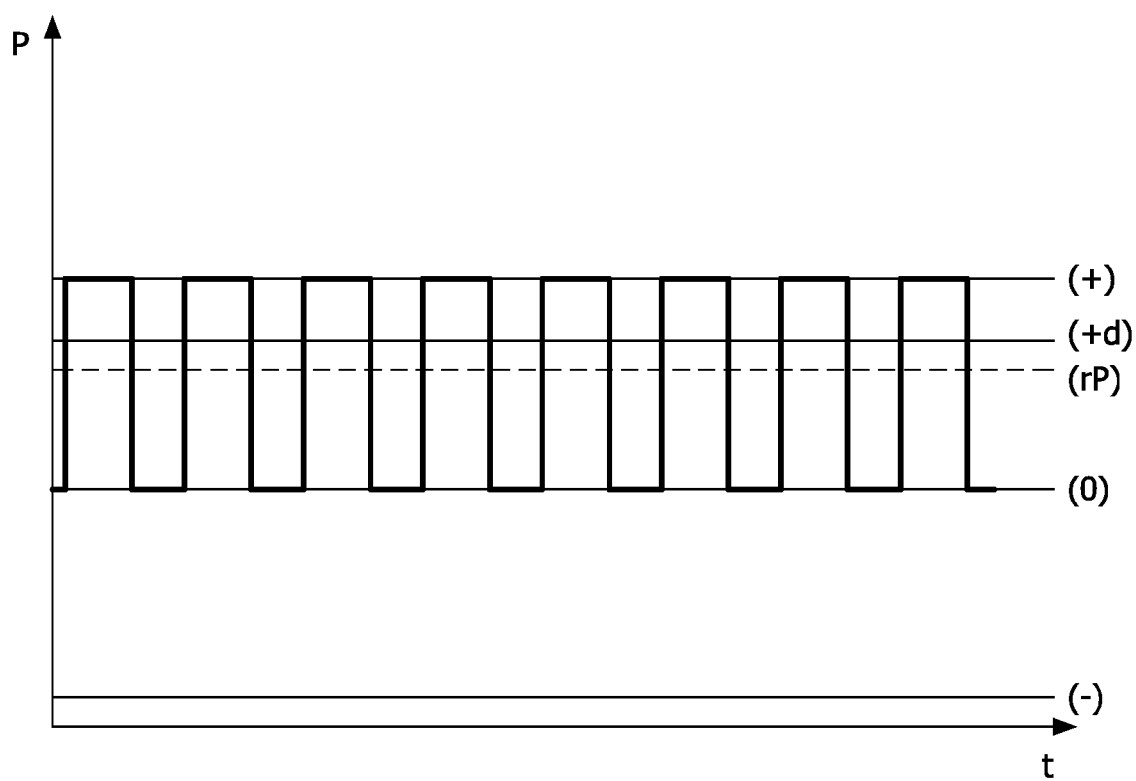
FIG. 8 shows an application of energy levels for operating point below a power level (below +d)

How both control modes are applied in respect to each other, namely in an alternating way and subsequent in time is illustrated by FIGS. 7 and 8. In these Figures power levels at the output of the series resonant converter 100 are shown at the vertical y-axis in relation to time, which is given on the horizontal x-axis.

Figure 6:
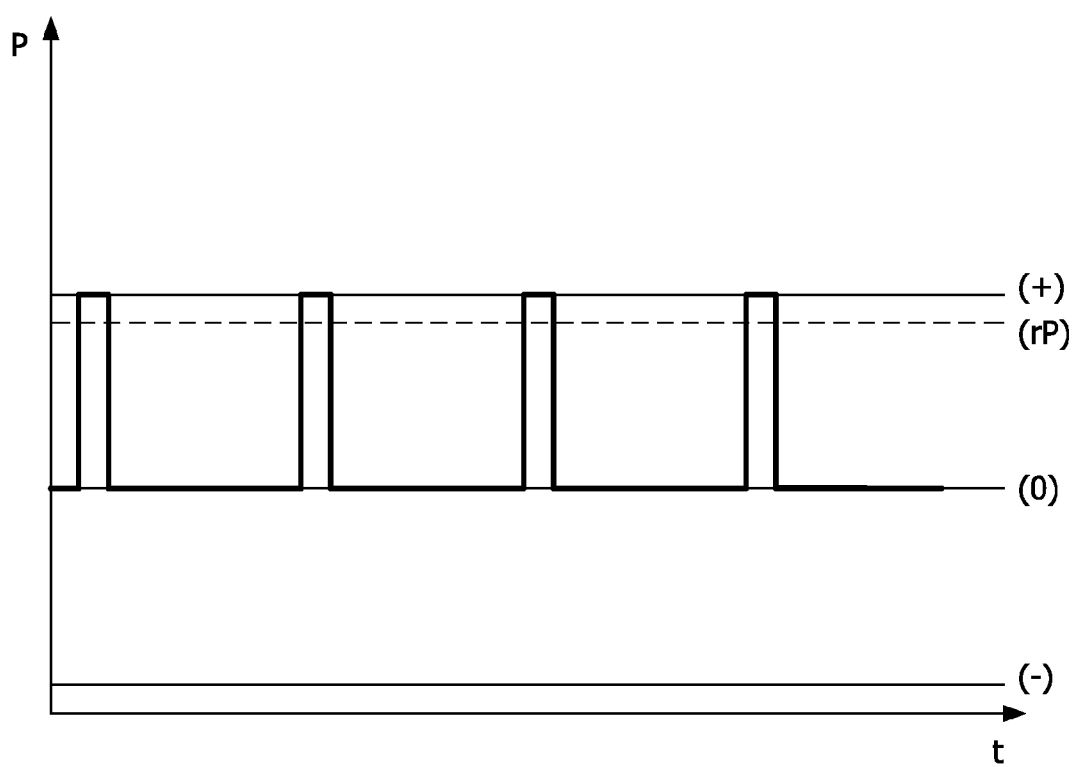
FIG. 6 shows an application of power levels for operating points near maximum output power.

In FIG. 6 there are shown two operation modes using only the first control mode. Three power levels are shown, a plus power level (+), which may be realized by the plus-state situation of FIG. 2, a zero power level (0), which may be realized by the zero-state-situation of FIG. 3 and a minus power level (−), which may be realized by the minus-state-situation of FIG. 4. In FIG. 6 only the plus-state-situation and the zero-state situation are used. This means that the power received at the output of the series resonant converter 100 is alternating between the plus power level and the zero power level. Here the time duration for the zero power level is more than for the plus-power-level, which can be seen from the curve form of the time depending power which has here a idealized rectangular waveform. The waveform represents the packages of energy which are transported from the first terminal 210 towards the third terminal 610 within the series resonant converter 100. The average integral part under the time depending curve of the applied power at the output of the series resonant converter is in average the required power shown as dotted line in FIG. 6.

In contrast to FIG. 6 with only one first control mode, FIG. 7 shows a situation where a first control mode and a second control mode are used. The x-axis and the y-axis are the same as in FIG. 6, namely describing time on the one hand and power level on the other hand. Also all three power levels of FIG. 6 can be found in FIG. 8. In addition FIG. 8 shows an additional power level (+d), which is used in a second control mode. There exists a power level, which is higher than the zero-power level and lower than the plus power level. This power level between is called in the following the "+d-powerlevel", which may be realized by using the switching condition of FIG. 5a, where the resonant current Ires and the switching voltage Uwr are now switched under a non-soft-switching condition. This non-soft-switching condition is characterized in a greater phase delay between the resonant current Ires and the switching voltage Uwr compared to switching with substantially non-phase difference. As can be seen from FIG. 6, the power levels used in an alternating manner do not reach the zero power level. This means the circuit stays in a relative stable condition in relation to the power level. On the one hand more switching losses occur due to the second control mode which violates the ZCS method, on the other hand chattering is reduced. The required output power (rP) in FIG. 7 is between the plus-power level (+) and the +d-power-level (+d).

As illustrated in FIG. 8, all four power levels (+), (−), (+d) and (0) are available, but only the plus-power-level (+) and the zero-power level (0) are used for operation. This is an example for a situation when only the first control mode is used. Whereas the time operating in the plus-power-level and in the zero-power-level are equal or more preferably the time in the plus-power-level is longer than in the 0 power level, as shown in FIG. 8. This situation may be used when starting the supply for a device like an x-ray tube connected with the third terminal 610. After a short time the control method may be changed in such a way that the situation of FIG. 7 occurs where instead of only the first control mode, the first and the second control mode are used in an alternating way as shown in FIG. 7.

It can be shown that the chattering frequency can be changed to a higher value, if there is an additional power level available, which is close to one of the used levels of the system. In the example of the x-ray system the plus-level will be used always, as the system may not operate with zero or minus levels only. For example, the voltage chattering for operating points near the maximum output power is reduced by an additional power level +d, that is very close to the plus-level energy. As can be seen in FIG. 7 operating points between the plus level energy and +d level energy are now controlled by alternating between two power levels that are closer to each other. This results in a higher chattering frequency and lower chattering amplitude. FIG. 7 shows the behavior for operating points just below the +d level power. Here the chattering amplitude is also reduced, as there is more surplus energy available than for operating points near the maximum output power. It can be shown also that the chattering frequency will affected positively for an operating point that usually works mostly with zero state and with plus-state.

FIGS. 5a and 5b show the voltage and current waveforms for the plus-level and +d level. The plus-level is achieved by activating the switches when the current crosses the zero line. Voltage and current are in phase. The +d level will be realized by switching a time $t_d$ earlier than the zero crossing as shown in FIGS. 5a and 5b. Voltage and current have a phase delay of a few degrees. This will lead to a little bit lower transferred energy. The switching losses are a little bit higher than for the plus-level, but are limited by the fact, that the phase delay $t_d$ can be very small.

Figure 9:
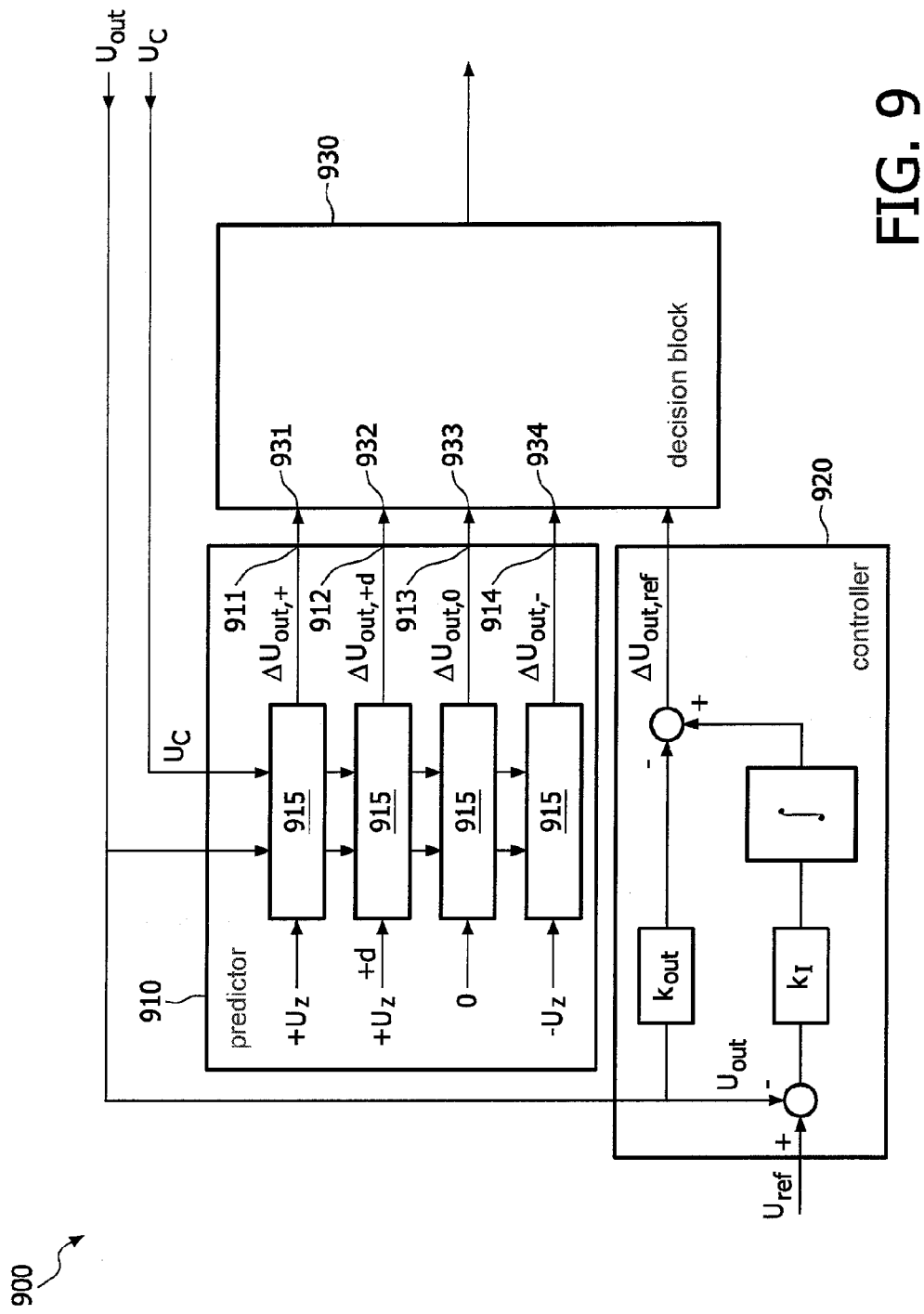
FIG. 9 shows a control strategy for a four-level control and FIG. 10 shows a measurement of output voltage for 60 kV operation point near maximum output power with and without fourth power level.

The control strategy for a four level controller with a control device 900 (FIG. 9) that can be used is similar to the control strategy used for the three-level controller. In FIG. 9 the control device 900 comprises a predictor 910, a controller 920 and a decision block 930. The predictor 910 predicts the change of the output voltage 600 of the rectifier for the next control cycle given by the zero crossing of the resonant current Ires for all possible switch configurations plus-level, zero-level, minus-level and the +d level. The PI controller 920 calculates a required change of the output voltage 600 for the next step. The decision block 930 then decides which control mode will be used, by choosing the control mode where the resulting change of the output voltage is closest to the required value. The predictor comprises an input for an output voltage Uout 600 and an input for a voltage Uc (voltage over capacitor 330). Both voltages Uout (600) and Uc are used for an analytic model 915. The decision block 930 chooses a power level (+), (−), (0) or (+d) depending on deltaUout that is closest to deltaUoutref, whereas deltaUoutref is calculated inside the controller 920, here a PI-controller. The value of deltaUoutref is given as an input to the decision block 930, independent from further inputs coming from the predictor 910. The output of the decision block is a control value, which is either (+), (−), (0) or (+d) within one controlling cycle to determine a required power level. After a first controlling cycle the next calculation starts within the for determining the following required control value, which depends on the required output power (rP).

Figure 10:
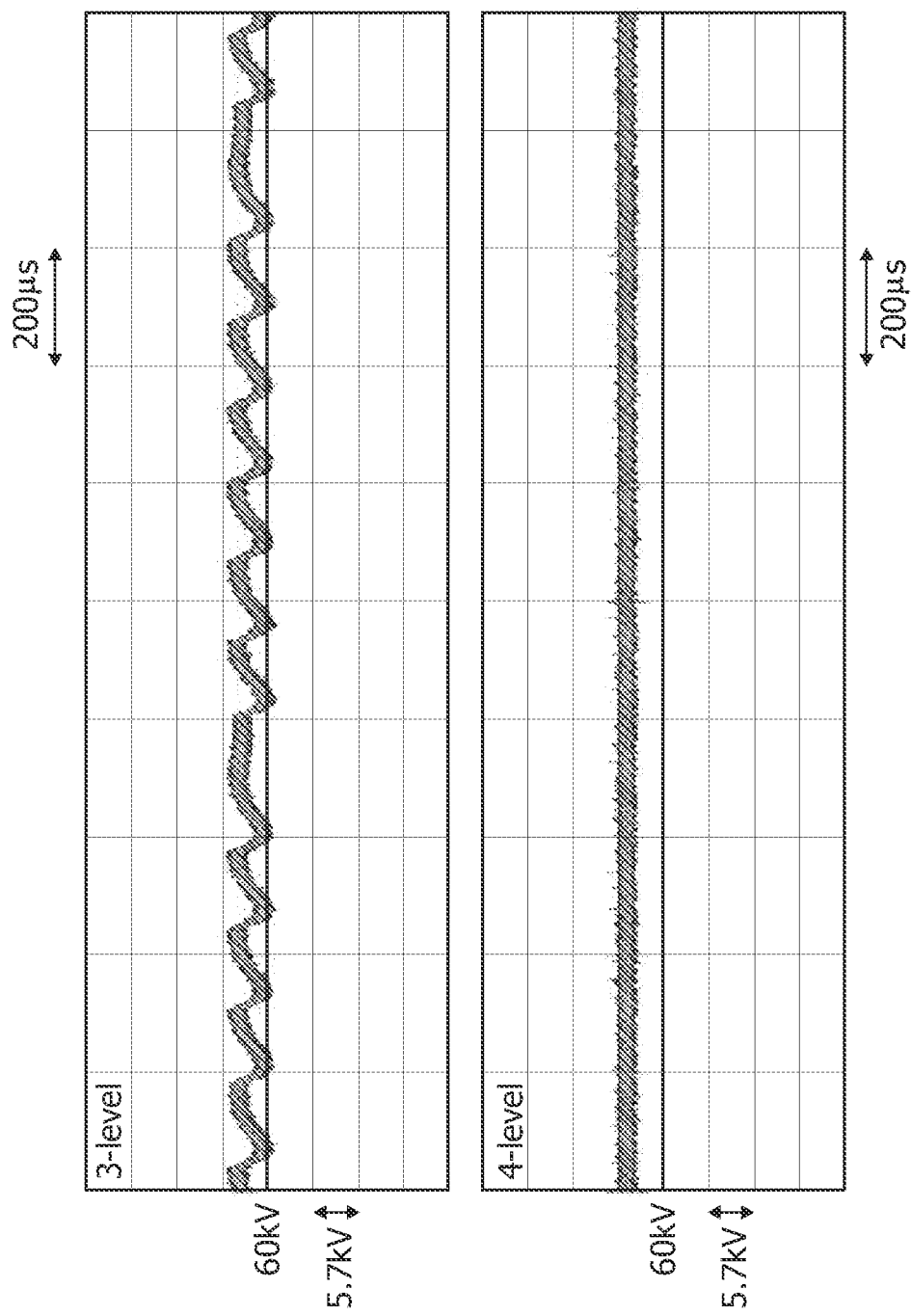

FIG. 10 depicts a measurement of the voltage chattering with activated +d power level. The chattering amplitude is drastically reduced if the +d power level is activated. As can be seen from FIG. 10 the time span of interest is e.g. in the range of μ-seconds and the output voltage of the series resonant converter is e.g. about 60 kV.

The invention may be used especially for resonant power converters in general, x-ray high voltage generators or controlled systems with a quantized resolution.

In the illustrated embodiments a one phase series resonant converter 100 was used for applying the proposed controlling method. However it is also in the scope of the invention to use multiple phases for the supply of an electronic device which is connected directly or indirectly with the output of the series resonant converter 100.

It should be understood that the illustration in the given Figures is only schematically, whereas the resonant current Ires may change in amplitude.

It should be noted, that the invention may be applied especially for resonant power converters in general, for x-ray high voltage generators and for controlled systems with quantized resolution.

It should be noted, that the reference signs in the claims shall not be construed as limiting the scope of the claims.

Further it should be noted, that the term "comprising" does not exclude other elements or steps and the "a" or "an" does not exclude a plurality. Also elements described in association with the different embodiments may be combined.

In the case of doubts in relation to the conditions of ZCS, the reference WO 2006/114719A1 should be consulted for further information.

It should be noted, that the above-mentioned embodiments illustrate rather than limit the invention and that those skilled in the art will be capable of designing many alternative embodiments without departing from the scope of the invention.

The invention claimed is:

1. A method for controlling a switching device, the method comprising the acts of:
providing a switching voltage by a resonant circuit for generating a resonant current in order to provide a required output power at an output of a resonant power converter; and
providing the required output power at the output of the resonant power converter by using a first control mode and a second control mode in an alternating sequence in order to provide at least three power levels including a zero power lever, a first power level and a second power level, wherein the first power level s higher than the second power level, wherein the first control mode is a soft switching control mode with respect to the switching voltage and to the resonant current, wherein the second control mode is a non-soft switching control mode with respect to the switching voltage and to the resonant current, wherein the act of providing the required output power initially provides pulses between the zero power level and the first power level so that the required output power is between the zero power level and the second power level, and subsequently provides further pulses between the second power level and the first power level so that the required output power is between the second power level and the first power level.

2. The method according to claim 1, wherein in the first control mode the switching voltage is zero.

3. The method according to claim 1, wherein in the first control mode the switching voltage and the resonant current are in a first predetermined phase relation to each other.

4. The method according to claim 1, wherein in the second control mode the switching voltage and the resonant current are in a second predetermined phase relation to each other.

5. The method according to claim 3, wherein the first predetermined phase relation between the switching voltage and the resonant current is substantially zero.

6. The method according to claim 3, wherein the first predetermined phase relation is substantially 180 degrees.

7. The method according to claim 4, wherein the second predetermined phase relation is greater than the first predetermined phase relation.

8. The method according to claim 4, wherein in the second predetermined phase relation is smaller than 90 degrees.

9. The method according to claim 4, wherein the resonant current is in delay in relation to the switching voltage in the second predetermined phase relation.

10. The method according to claim 1, wherein the switching device is controlled that the first control mode provides the first power level and that the second control mode provides the second power level.

11. The method according to claim 1, wherein the switching device is controlled that the first control mode provides a fourth power level.

12. A control device comprising:
an input for receiving data representative of a required output power,
a controller,
a predictor, and
a decision block,
wherein the decision block is configured to generate a value to decide a control mode for providing an output power depending on the required output power,
wherein the controller is configured to calculate a required change of the output power and the controller generates a value for the decision block,
wherein the predictor comprises a first output for a first control mode, which is a soft switching control mode,
wherein the predictor comprises a second output for a second control mode, which is a non-soft switching control mode,
wherein the controller is configured to combine both control modes in arbitrary sequence,
wherein the controller is further configured to provide at least three power levels including a zero power lever, a first power level and a second power level, wherein the first power level is higher than the second power level, and
wherein the controller is further configured to initially provide pulses between the zero power level and the first power level so that the required output power is between the zero power level and the second power level, and subsequently provides further pulses between the second power level and the first power level so that the required output power is between the second power level and the first power level.

13. The control device according to claim 12, wherein the predictor further comprises at least one of a third output for the first control mode, and a fourth output for the first control mode.

14. The control device according to claim 12, wherein the decision block comprises:
a second input, which is connected with the second output of the predictor,
and further comprises at least one of:
a first input, which is connected with the first output of the predictor,
a third input, which is connected with the third output of the predictor, and
a fourth input, which is connected with the fourth output of the predictor.

15. A resonant power converter with a control device, the control device comprising:
an input for receiving data representative of a required output power;
a controller;
a predictor; and
a decision block;
wherein the decision block is configured to generate a value to decide a control mode for providing an output power depending on the required output power,
wherein the controller is configured to calculate a required change of the output power and the controller generates a value for the decision block,
wherein the predictor comprises a first output for a first control mode, which is a soft switching control mode,
wherein the predictor comprises a second output for a second control mode, which is a non-soft switching control mode,
wherein the controller is configured to combine both control modes in arbitrary sequence,
wherein the controller is further configured to provide at least three power levels including a zero power lever, a first power level and a second power level, wherein the first power level is higher than the second power level, and
wherein the controller is further configured to initially provide pulses between the zero power level and the first power level so that the required output power is between the zero power level and the second power level, and subsequently provides further pulses between the second power level and the first power level so that the required output power is between the second power level and the first power level.

* * * * *